United States Patent
Siba et al.

(10) Patent No.: US 10,645,057 B2
(45) Date of Patent: May 5, 2020

(54) DOMAIN NAME SYSTEM IDENTIFICATION AND ATTRIBUTION

(71) Applicant: Cisco Technology, Inc., San Jose, CA (US)

(72) Inventors: Lucas Jonathan Siba, Langley (CA); Brian Somers, North Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 495 days.

(21) Appl. No.: 15/189,268

(22) Filed: Jun. 22, 2016

(65) Prior Publication Data

US 2017/0374015 A1  Dec. 28, 2017

(51) Int. Cl.
*H04L 29/12* (2006.01)

(52) U.S. Cl.
CPC ...... *H04L 61/1511* (2013.01); *H04L 61/6059* (2013.01)

(58) Field of Classification Search
CPC .......................... H04L 61/6059; H04L 61/1511
See application file for complete search history.

(56) References Cited

U.S. PATENT DOCUMENTS

| | | | |
|---|---|---|---|
| 6,023,724 A | 2/2000 | Bhatia et al. | |
| 7,792,994 B1 * | 9/2010 | Hernacki | H04L 12/66 709/229 |
| 8,161,148 B2 | 4/2012 | Tamura | |
| 8,325,739 B2 | 12/2012 | Van De Poel et al. | |
| 8,699,515 B2 | 4/2014 | Townsley et al. | |
| 9,032,098 B2 | 5/2015 | Van De Poel | |
| 2003/0229697 A1 * | 12/2003 | Borella | H04L 29/06 709/226 |
| 2005/0021841 A1 | 1/2005 | Yoshimoto | |
| 2005/0210139 A1 | 9/2005 | Hightower et al. | |
| 2008/0155657 A1 * | 6/2008 | Ogura | H04L 63/0435 726/3 |
| 2009/0059936 A1 * | 3/2009 | Van De Poel | H04L 29/12066 370/401 |
| 2011/0173348 A1 * | 7/2011 | Van De Poel | H04L 12/4625 709/249 |
| 2013/0205035 A1 * | 8/2013 | Chen | H04L 61/251 709/230 |
| 2013/0275570 A1 * | 10/2013 | Treuhaft | H04L 61/1511 709/223 |

(Continued)

*Primary Examiner* — Abdullahi E Salad
(74) *Attorney, Agent, or Firm* — Edell, Shapiro & Finnan, LLC

(57) ABSTRACT

Techniques are presented herein for a DNS resolver to encode a falsified IP address with a client identifier that identifies a client attempting to access a blocked domain. The DNS resolver receives, from a client, a DNS request that contains a requested domain name and a client identifier. The DNS resolver then determines the identity of the client from the client identifier in the DNS request. The DNS resolver then applies policies for the domain name system request to determine that the requested domain name should be blocked for the identity of the client. The DNS resolver may then construct a falsified Internet Protocol address when the domain name should be blocked for the identified client, where the falsified Internet Protocol is encoded with the client identifier. The DNS resolver then sends to the client, in response to the DNS request, the falsified Internet Protocol address.

20 Claims, 7 Drawing Sheets

(56) References Cited

U.S. PATENT DOCUMENTS

| | | | |
|---|---|---|---|
| 2014/0189160 A1* | 7/2014 | Haddad | H04L 61/251 709/245 |
| 2015/0033344 A9* | 1/2015 | Holloway | G06F 16/958 726/24 |
| 2015/0365441 A1* | 12/2015 | Lemon | G06F 16/90335 726/1 |
| 2016/0226824 A1* | 8/2016 | Martini | H04L 63/101 |
| 2016/0308818 A1* | 10/2016 | Torres | H04L 67/2842 |
| 2017/0187703 A1* | 6/2017 | Enrique Salpico | G06F 21/44 |
| 2017/0264600 A1* | 9/2017 | Froelicher | H04L 63/062 |
| 2017/0318035 A1* | 11/2017 | Baughman | H04L 63/1416 |
| 2018/0018465 A1* | 1/2018 | Carey | G06F 21/577 |
| 2019/0014083 A1* | 1/2019 | Xu | G06F 16/955 |

* cited by examiner

DOMAIN NAME SYSTEM IDENTIFICATION AND ATTRIBUTION

TECHNICAL FIELD

The present disclosure relates to the Domain Name System naming center for Internet-connected resources.

BACKGROUND

The Domain Name System (DNS) is a decentralized naming system for resources (e.g., computers, services, etc.) that are connected to the Internet. In general, the DNS operates to translate/resolve human-readable hostnames associated with a resource, sometimes referred to herein as domain names, into a numerical network address (e.g., an Internet Protocol (IP) address) that is needed to locate and identify the resource with the underlying network protocols.

The DNS is maintained as a distributed database system that makes use of the client-server model. The nodes of this database are the name servers, where each domain has at least one authoritative name server that publishes information about that domain and about any name servers of any domains subordinate thereto. DNS resolvers form the client side of the DNS. A DNS resolver is responsible for initiating and sequencing the queries that lead to a full resolution (translation) of the resource sought (e.g., translation of a domain name into a network address).

DESCRIPTION OF EXAMPLE EMBODIMENTS

Overview

A Domain Name System (DNS) resolver receives a DNS request from a client device. The DNS request is a query for a network address of one or more resources associated with a requested domain name. The DNS resolver determines that the client device should be blocked from accessing the resources associated with the requested domain name and extracts, from the DNS request, information associated with the client device. The DNS resolver constructs a falsified network address based on the requested domain name and encodes the falsified network address to include the information associated with the client device that was extracted from the DNS request. The DNS resolver sends, to the client device, a domain name system response that associates the falsified network address with the requested domain name.

EXAMPLE EMBODIMENTS

Figure 1:
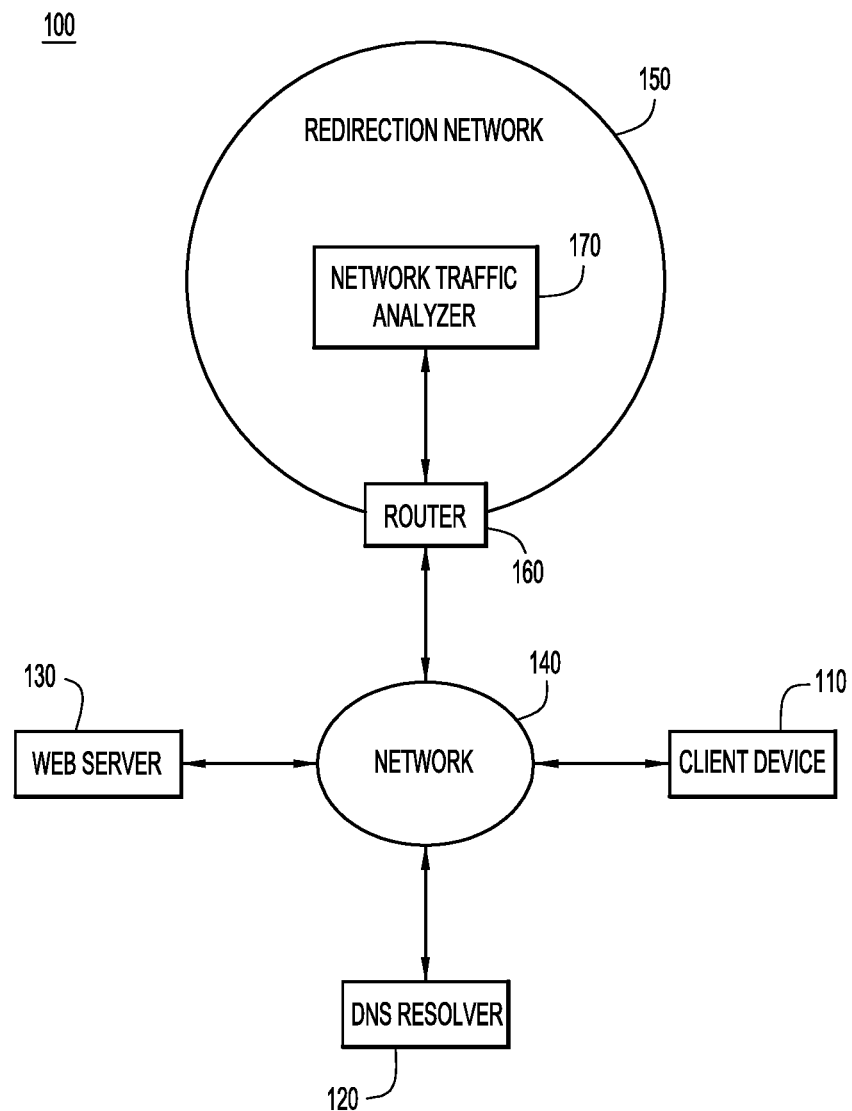
FIG. 1 is a schematic block diagram of a segment of a Domain Name System (DNS) configured to generate a falsified network address with encoded client information, according to an example embodiment.

FIG. 1 illustrates a segment 100 of a Domain Name System (DNS) in which a DNS resolver is configured to generate falsified network addresses that include client information in accordance with examples presented herein (i.e., generate a falsified network addresses with encoded client information). The DNS system segment 100 includes at least one client device 110, a DNS resolver 120, and at least one web server 130. The client device 110, the DNS resolver 120, and the web server 130 may be connected to a communication network 140. The DNS resolver 120 is, for example, a server or network of servers configured to resolve domain names into network addresses, such as Internet Protocol (IP) addresses, of resources associated with the domain name. The web server 130 is for example, a server or network of servers reachable at a network address and configured to deliver web content to one or more client devices.

Also shown in FIG. 1 is a redirection network 150. The redirection network 150 includes at least one router 160 deployed, for example, at the edge of the redirection network 150 and a network traffic analyzer 170. The router 160 is connected to the network 140 and is in communication with the network traffic analyzer 170 via, for example, a local area network (LAN) (not shown in FIG. 1). As described further below, in the example arrangement of FIG. 1, the router 160 is configured to route all network traffic received by the router to the network traffic analyzer 170. While not illustrated, the redirection network 150 may further include other entities in communication with the network traffic analyzer 170 and/or router 160.

The DNS resolver 120 is configured to receive a DNS request from the client device 110. The received DNS request is a query for a network address (e.g., IP address) of one or more resources associated with a domain name identified in the DNS request, referred to herein as a requested domain name. In general, the DNS resolver 120 is configured to translate/resolve the requested domain name into the associated network address. However, in the specific example of FIG. 1, the DNS resolver 120 determines that the client device 110 should be blocked from accessing the resources associated with the requested domain name (e.g., determines that the requested domain is malicious). As such, the DNS resolver 120 generates/constructs a falsified network address that can be returned to the client device 110. The falsified network address, which is generated based on the requested domain name, is configured to direct the client device 110 away from the resources associated with the requested domain name. In other words, the falsified network address, when used by the client device 110, connects the client device 110 to other pre-determined resources, thereby protecting the client device 110 from the resources associated with the requested domain name.

In accordance with examples presented herein, the DNS resolver 120 is also configured to extract, from the DNS request received from the client device 110, information associated with the client device 110. This information, which is sometimes referred to herein as client information, may include, for example, the identity of the client device 110. When generating the falsified network address, the DNS resolver 120 is configured to encode the client information (i.e., the information associated with the client device 110 that was extracted from the DNS request) into the falsified network address. The DNS resolver 120 then sends, to the client device 110, a DNS response that associates the falsified network address with the requested domain name.

The client device 110 is unaware that the network address returned in the DNS response is a "falsified" network address. Instead, the client device 110 interprets the falsified network address as corresponding to the resources associated with the requested domain name. As such, the client device 110 attempts to connect to (communicate with) the resources associated with the requested domain name using the falsified network address. However, as described further below, the falsified network address is associated with re-direction network 150, namely router 160. That is, the use of the falsified network address by the client device 110 causes the traffic from the client device 110 to be sent to router 160, rather than the resources associated with the requested domain name. The router 160 is configured to route all traffic received on the falsified network address to the network traffic analyzer 170.

Upon receiving traffic sent by the client device 110 using the falsified network address, the network traffic analyzer 170 is configured to proxy or block the traffic while logging the traffic's details, along with the client information encoded in the falsified network address. In other words, the network traffic analyzer 170 is configured to extract and log the client information from the falsified network address, along with other information about the received traffic.

In the example of FIG. 1, the networks 140 and 150 may include or comprise, without limitation, any one or more of local or wide area networks, IP networks, telephone networks (e.g., public switched telephone networks), wireless or mobile phone or cellular networks, and any suitable combinations thereof. In addition, the depiction of a single client device 110 in FIG. 1 is for example purposes only, and it is noted that the network 140 connecting the client device 110, the DNS resolver 120, and the web server 130, can support communications and exchange of data between any number of clients or other devices.

Client device 110 may comprise any of a number of different types of computing devices including, without limitation, a personal computer (PC) device (e.g., desktop computer or laptop computer), a mobile computing device (e.g., mobile phones, note pads, tablets, personal data assistant (PDA) devices), etc. The client device 110, DNS resolver 120, web server 130, network traffic analyzer 170, and other devices of the system 100 can utilize any suitable operating system to transfer data between the client device 110, DNS resolver 120, web server 130, and network traffic analyzer 170. In addition, the techniques described herein for creating a falsified IP address encoded with the client information (e.g., identity of the client device 110) and for logging the identity of the client from the falsified network address can be integrated with any suitable type of commercial software products.

While the DNS system segment 100 illustrated in FIG. 1 is configured to generate falsified network addresses that include client information, the example embodiments illustrated in FIGS. 2, 3, 4A, 4B, and 5 are associated with the generation of a specific type of network address, namely a falsified Internet Protocol (IP) address. The examples illustrated in FIGS. 2, 3, 4A, 4B, and 5 are for illustrative purposes, and it is noted that the same or similar features can also be provided for generating other types of falsified network addresses encoded with client information.

Figure 2:
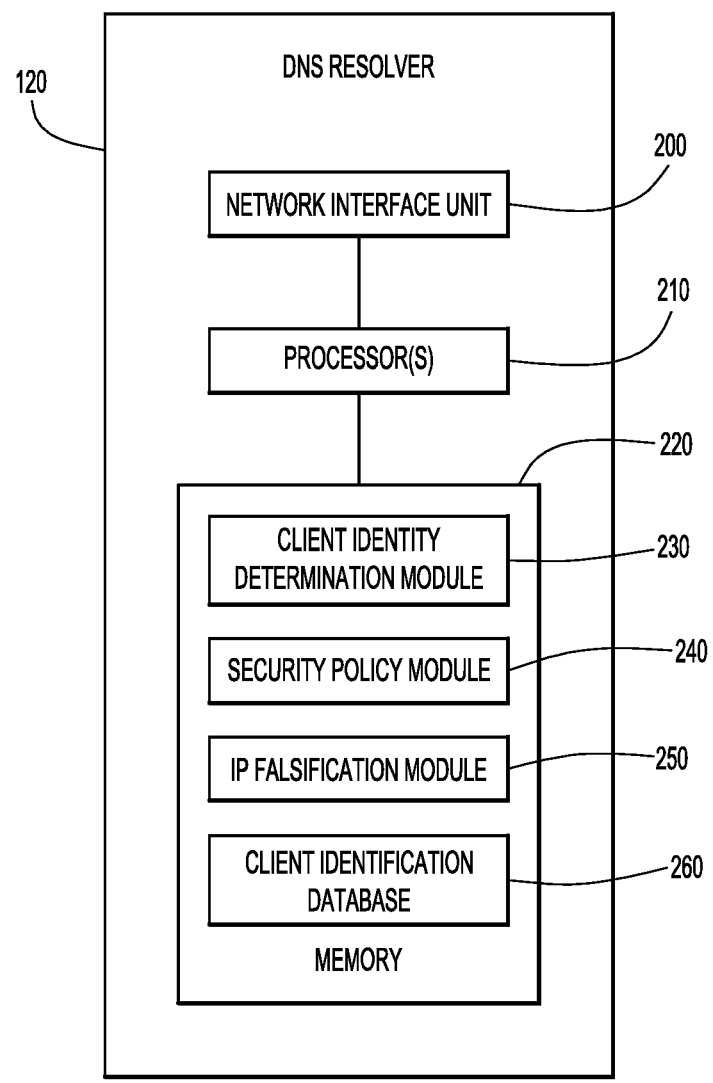
FIG. 2 is a block diagram of a DNS resolver configured to generate a falsified network address with encoded client information, according to an example embodiment.

Illustrated in FIG. 2 is an example block diagram of the DNS resolver 120. The DNS resolver 120 includes a network interface unit 200, one or more processor(s) 210, and a memory 220. The network interface unit 200 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 200 may include a wireless network interface unit to facilitate wireless communication over network 140 illustrated in FIG. 1.

The processor(s) 210 may be embodied by one or more microprocessors or microcontrollers, and execute software instructions stored in memory 220 for the client identity determination module 230, security policy module 240, IP falsification module 250, and client identification database 260 in accordance with the techniques presented herein in connection with FIGS. 1, 3, 4A, 4B, and 5-7.

Memory 220 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 220 may comprise one or more tangible (e.g., non-transitory) computer readable storage media (e.g., a memory device) encoded with software comprising computer executable instructions, and when the software is executed by the processor(s) 210, the processor(s) 210 are operable to perform the operations described herein by executing instructions associated with the client identity determination module 230, the security policy module 240, and the IP falsification module 250. In other approaches, the client identity determination module 230, the security policy module 240, the IP falsification module 250, and client identification database 260 may be stored remotely, external to the DNS resolver 120, but accessible by the processor(s) 210. The client identity determination module 230 enables the DNS resolver 120 to obtain and collect the information about the client device 110 (e.g., client information) when the client device sends a DNS request to the DNS resolver 120.

The client information may contain, among other data, the identity of the client device 110. In one example, the identity of the client device 110 is obtained from a source IP address, user identifier (ID), global unique identifier (GUID), security tokens, etc. present in the DNS request. For example, the DNS resolver 120 can inspect the network packet(s) forming the DNS request to determine the source IP address of the packet.

A DNS request may be generated in accordance with one or more extension mechanisms for DNS, generally referred to as EDNS. In particular, EDNS is a specification for expanding the size of several parameters of the DNS protocol. For example, EDNS may allow additional flags, label types, and/or return codes to be defined in a DNS request. In one form, EDNS may allow the sender of a DNS request (e.g., client device 110) to advertise its own extended capabilities to the message receiver (e.g., DNS resolver 120).

In certain examples, the client information may be obtained from one or more of DNS extensions. For example, a device ID resource record may be provided in an additional section of a DNS request.

In one example, once the DNS resolver 120 extracts the client information from the DNS request, the client identification determination module 230 may further allow the DNS resolver 120 to access the client identification database 260 to identify a unique client identifier for the identified client device 110. The DNS resolver 120 may utilize the client identification database 260 to determine a unique client identifier that can be interpreted by both the DNS resolver 120 and the network traffic analyzer 170.

The security policy module 240 enables the DNS resolver 120 to determine, based on the extracted client information, whether or not the identified client device 110 should be blocked from accessing the resources associated with the requested domain in the DNS request. The security policy module 240 may include, or provide the DNS resolver 120 with access to, a plurality of block lists. The DNS resolver 120 may utilize the plurality of block lists whether the policies allow the identified client device 110 to access the resources associated with requested domain.

The IP falsification module 250 enables the DNS resolver 120 to generate, in response to DNS request from the client device 110 and based on the determination from the security policy module 240 that the client device 110 should be blocked from the requested domain, a falsified IP address to the client device 110. The IP falsification module 250 further enables the DNS resolver 120 to encode the falsified IP address provided to the client device 110 with the client information of the client device 110. In addition to encoding the falsified IP address with the client information (e.g., client identifier), the IP falsification module 250 may also enable the DNS resolver 120 to encode the falsified IP address with additional information regarding the DNS request, the client device 110, and the administrator policies for the identified client device 110 (e.g., codes that describe what the client device 110 was attempting to do).

The functions of the processor(s) 210 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 2 shows that the DNS resolver 120 may be embodied as a dedicated physical device, it should be understood that the functions of the DNS resolver 120 may be embodied as software running in a data center/cloud computing system, together with numerous other software applications.

Figure 3:
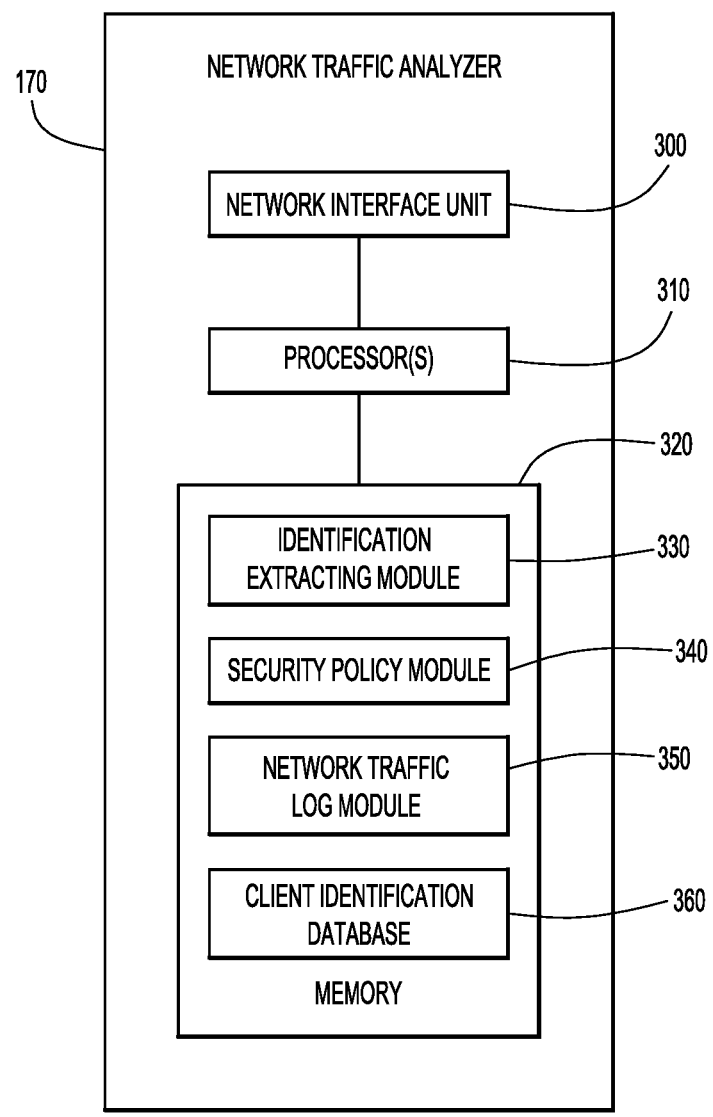
FIG. 3 is a block diagram of a network traffic analyzer configured to receive falsified network addresses with encoded client information, according to an example embodiment.

Illustrated in FIG. 3 is an example block diagram of the network traffic analyzer 170. The network traffic analyzer 170 may be configured to perform the techniques presented herein. The network traffic analyzer 170 includes a network interface unit 300, one or more processor(s) 310, and a memory 320. Similar to the network interface unit 200 of the DNS resolver 120, the network interface unit 300 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 300 may include a wireless network interface unit to facilitate wireless communication over network 140 and redirection network 150 illustrated in FIG. 1.

The processor(s) 310, similar to the processor(s) 210 of the DNS resolver 120, may be embodied by one or more microprocessors or microcontrollers, and executes software instructions stored in memory 320 for the identification extracting module 330, security policy module 340, network traffic log module 350, and client identification database 360 in accordance with the techniques presented herein in connection with FIGS. 1-2, 4A, 4B, and 5-7.

Memory 320, similar to memory 220 of the DNS resolver 120, may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 320 may comprise one or more tangible (e.g., non-transitory) computer readable storage media (e.g., a memory device) encoded with software comprising computer executable instructions, and when the software is executed by the processor(s) 310, the processor(s) 310 is operable to perform the operations described herein by executing instructions associated with the identification extracting module 330, the security policy module 340, and the network traffic log module 350. In other approaches, and as previously described, the identification extracting module 330, the security policy module 340, the network traffic log module 350, and client identification database 360 are stored remotely, external to the network traffic analyzer 170, but accessible by the processor(s) 310. The identification extracting module 330 enables the network traffic analyzer 170 to analyze every network traffic packet received by the redirection network 150 to obtain and collect the identity of the client device 110 that is encoded in the falsified IP address found within network packets (traffic) sent thereto. As previously noted, the falsified IP address provided by the DNS resolver 120 to the client device 110 points the client device 110 to the redirection network 150. More specifically, when the client device 110 sends a connection request message to the falsified IP address provided by the DNS resolver 120, the connection request message is sent to the network traffic analyzer 170 via the router 160 of the redirection network 150. The identification extracting module 320 enables the network traffic analyzer 170 to analyze the connection request message for the IP address, and then extract the unique client identifier located within the IP address. The identification extracting module 320 may further enable the network traffic analyzer 170, once it has extracted the unique client identifier, to look up the identity of the client in the client identification database 360 with the unique client identifier.

The security policy module 340, similar to the security policy module 240 of the DNS resolver 120, may provide the network traffic analyzer 170 with a plurality of block lists created by an administrator. The security policy module 340 may utilize the plurality of block lists provided by the security policy to look up the extracted client identifier or the client identity and determine whether or not the network traffic analyzer 170 should provide the identified client device 110 with a block or landing page that, for example, informs the client device 110 that the resources associated with the requested domain are not accessible or are malicious.

The network traffic log module 350 enables the network traffic analyzer 170 to proxy or block incoming traffic sent to the redirection network 150, while also logging or recording the details of the traffic and the client identity for the traffic. As stated earlier, the router 160 of the redirection network 150 is configured to route all inbound traffic of the redirection network 150 to the network traffic analyzer 170. An example of a log line produced by the network traffic log module 350 of the network traffic analyzer 170 may be similar to: "Client '1234:ABCD' was attempting to go to 'www.example.com' over IPv6." The log created by the network traffic analyzer 170 through the network traffic log module 350 may be shared or viewed by network administrators, organizations, etc.

The functions of the processor(s) 310 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 3 shows that the network traffic analyzer 170 may be embodied as a dedicated physical device, it should be understood that the functions of the network traffic analyzer 170 may be embodied as software running in a data center/cloud computing system, together with numerous other software applications.

Figure 4A:
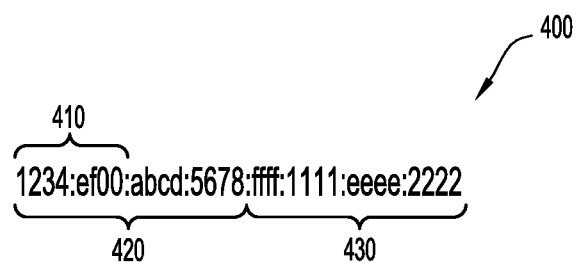
FIG. 4A is an Internet Protocol (IP) version 6 (IPv6) address for a domain/resource, according to an example embodiment.
Figure 4B:
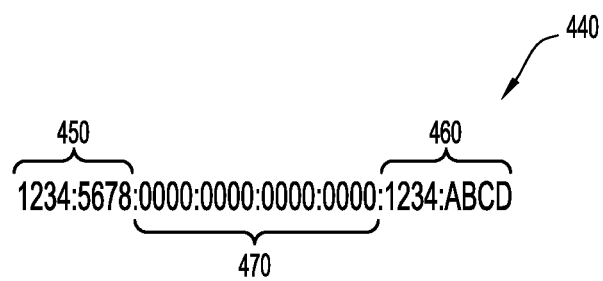
FIG. 4B is a falsified IPv6 address that includes encoded client information, according to an example embodiment.

FIGS. 4A and 4B illustrate examples of IPv6 addresses. IPv6 addresses are 128 bits long and written in eight groups of four hexadecimal digits. Thus, each group of four hexadecimal digits is 16 bits long. For example, FIG. 4A illustrates these eight groups where each of the groups are separated by colons. The eight groups may also be divided into two portions/parts of the IPv6 address, a network portion and a host portion. The IPv6 address may be split such that the host portion of the IPv6 address is at least 64 bits (i.e., last four groups) of the IPv6 address. In particular, the most-significant bits are the subnet prefix, or network portion of the IPv6 address, to which the host is connected. The network portion may be the first few sets of bits of the IPv6 address, while the remaining bits of the IPv6 address are the identifier of the host interface on the subnet. Thus, up to the first four groups (i.e., 64 bits) may be used to represent the network portion of the address. The network portion is used by network routers to determine where to send the IPv6 packet. The remaining groups of the IPv6 address are used to address a specific client inside the network represented by the first two to four groups of the IPv6 address. Illustrated in FIG. 4A is an example of an IPv6 address 400 that would direct the client device 110 to the web server 130 to acquire web content and resources from the web server 130. As illustrated, the network address portion of the IPv6 address 400 may be represented by the first two groups 410 of the IPv6 address 400, which recite the network address of "1234:ef00," or may be represented by the first four groups 420 of the IPv6 address 400, which recite the network address of "1234:ef00:abcd:5678." Other combination of bits may also be used to represent the network address so long as the host portion of the address is at least 64 bits. In the event that the first four groups 420 represent the network portion, the last four groups 430 of the IPv6 address 400 represent the specific client on the network, where the client has the specific address of "ffff:1111: eeee:2222."

However, illustrated in FIG. 4B is a falsified IPv6 address 440. In the illustrated example, the falsified IPv6 address 440 has a network address portion 450 of "1234:5678." In the illustrated example, the network address portion 450 would direct the client device 110, when attempting to connect to the falsified IPv6 address 440, to the redirection network 150. While the network address portion 450 of the illustrated falsified IPv6 address 440 only utilizes the first two groups of the falsified IPv6 address 440, as noted above, the network address portion 450 may utilize any number of bits of the first four groups of the falsified IPv6 address 440. The remaining groups of the falsified IPv6 address 440 may be used by the DNS resolver 120 to encode the falsified IPv6 address 440 with the client identifier 460 and/or other client information.

As illustrated in FIG. 4B, the last two groups of the falsified IPv6 address 440 is encoded with the client identifier 460. Thus, in the illustrated example, the client identifier 460 is represented by the hexadecimal "1234:ABCD." The IP falsification module 250 of the DNS resolver 120 encodes these last two groups of the falsified IPv6 address 440 with the client identifier 460. Once an IPv6 network packet is received by the network traffic analyzer 170, the identification extracting module 330 of the network traffic analyzer 170 analyzes the packet for the IPv6 address and looks to the final two groups of the falsified IPv6 address 440 to extract the client identifier 460. As further illustrated, the IPv6 address 440 may include a third portion 470. In the example illustrated in FIG. 4B, the third portion 470 includes four groups between the network address portion 450 and the client identifier 460. The third portion 470 could be used by the DNS resolver 120 to encode addition information it wishes to relay to the network traffic analyzer 170, or could be filled with zeros if unused. The DNS resolver 120 and the network traffic analyzer 170 may have agreed on a format or policy for how the falsified IPv6 address 440 would be encoded.

Figure 5:
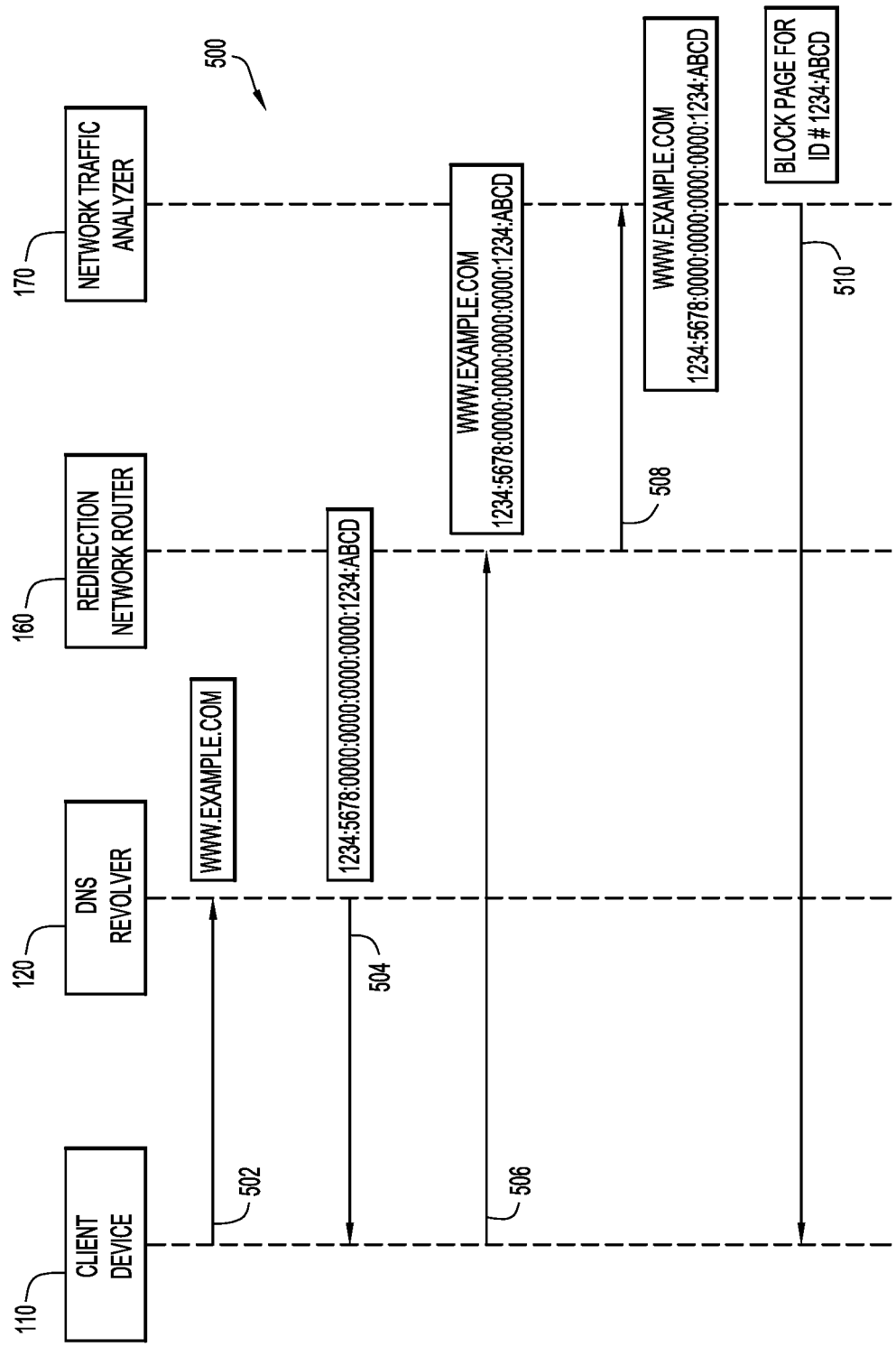
FIG. 5 is a ladder diagram depicting messages between various components to process a DNS request, and create a falsified IP addresses with encoded client information, according to an example embodiment.

FIG. 5 is a ladder diagram 500 depicting messages sent between the DNS resolver 120 and the other various devices of the system 100 illustrated in FIG. 1. The client device 110 issues or originates a DNS request 502 to the DNS resolver 120. In this particular example, the DNS request 502 is for the resources associated with a domain name of "www.example.com." In addition, the DNS request 502 may include the source IP address of the client device 110. In response to the DNS request 502, the DNS resolver 120 utilizes the client identity determination module 230 to extract the client information, which includes the client identity, from the DNS request 502. As noted previously, the client identity may be acquired by analyzing the source IP address included in the DNS request 502 or, if the DNS request 502 is an EDNS packet, may extract the data encoded in the EDNS request. Once acquiring the client identity from the DNS request 502, the DNS resolver 120, via the security policy module 240, checks whether the resources associated with the requested domain of "www.example.com" should be blocked or redirected for the identity of the client device 110. The requested domain may be blocked for security reasons or for policy reasons that are determined by the network administrator of the client device 110. If the requested domain is on a list of domains to block or redirect for the identified client device 110, the DNS resolver 120 does not provide the actual IPv6 for the requested domain, but, instead, creates a falsified IPv6 address 440 via the IP falsification module 250, where the falsified IPv6 440 address is encoded with the unique client identifier of the identified client device 110. The DNS resolver 120 may look up the client identity in the client identification database 360. The client identification database 360 returns a unique client identifier of "1234:ABCD" 460 for the client device 110. The DNS resolver 120 issues a DNS response 504 that may contain the falsified IP address of "1234:5678:0000:0000:

0000:0000:1234:ABCD," which is encoded with the client identifier of "1234:ABCD" 460 obtained from the client identification database 260.

The client device 110 interprets the falsified IPv6 address 440 as the IPv6 address of the requested domain "www.example.com." Thus, the client device 110 may generate a connection request or a resource request 506, where the resource request 506 may include the requested domain "www.example.com" and the falsified IPv6 address 440. As previously noted, and as illustrated in FIG. 5, the falsified IPv6 address 440 may direct the resource request 506 from the client device 110 to the redirection network 150, where the router 160, disposed on or proximate to the edge of the network 150, receives the resource request 506. As previously noted, the router 160 is configured to direct all inbound network traffic of the redirection network 150 to the network traffic analyzer 170. Thus, at 508, the router 160 directs the resource request 506 to the network traffic analyzer 170.

Once the network traffic analyzer 170 receives the redirected resource request 508, the network traffic analyzer 170, via the identification extraction module 330, examines the falsified IPv6 address 440 for the client identifier 460 and extracts the client identifier 460. Using the network traffic log module 350, the network traffic analyzer 170 logs the traffic details of the resource request 506 along with the client identifier 460. In addition, the network traffic analyzer 170 may utilize the security policy module 340 to lookup the client identifier 460 and determine whether the network traffic analyzer 170 should provide a block or landing page to for the identified client device 110. In the example illustrated in FIG. 5, the network traffic analyzer 170 generates a response 510 that includes a block or landing page indicating to the client device 110 that they are not permitted to access the requested domain. The block or landing page sent in response 510 may be customized based on the client device 110, the policies set by the network administrator, or the policies set by the organization of the client device 110.

Figure 6:
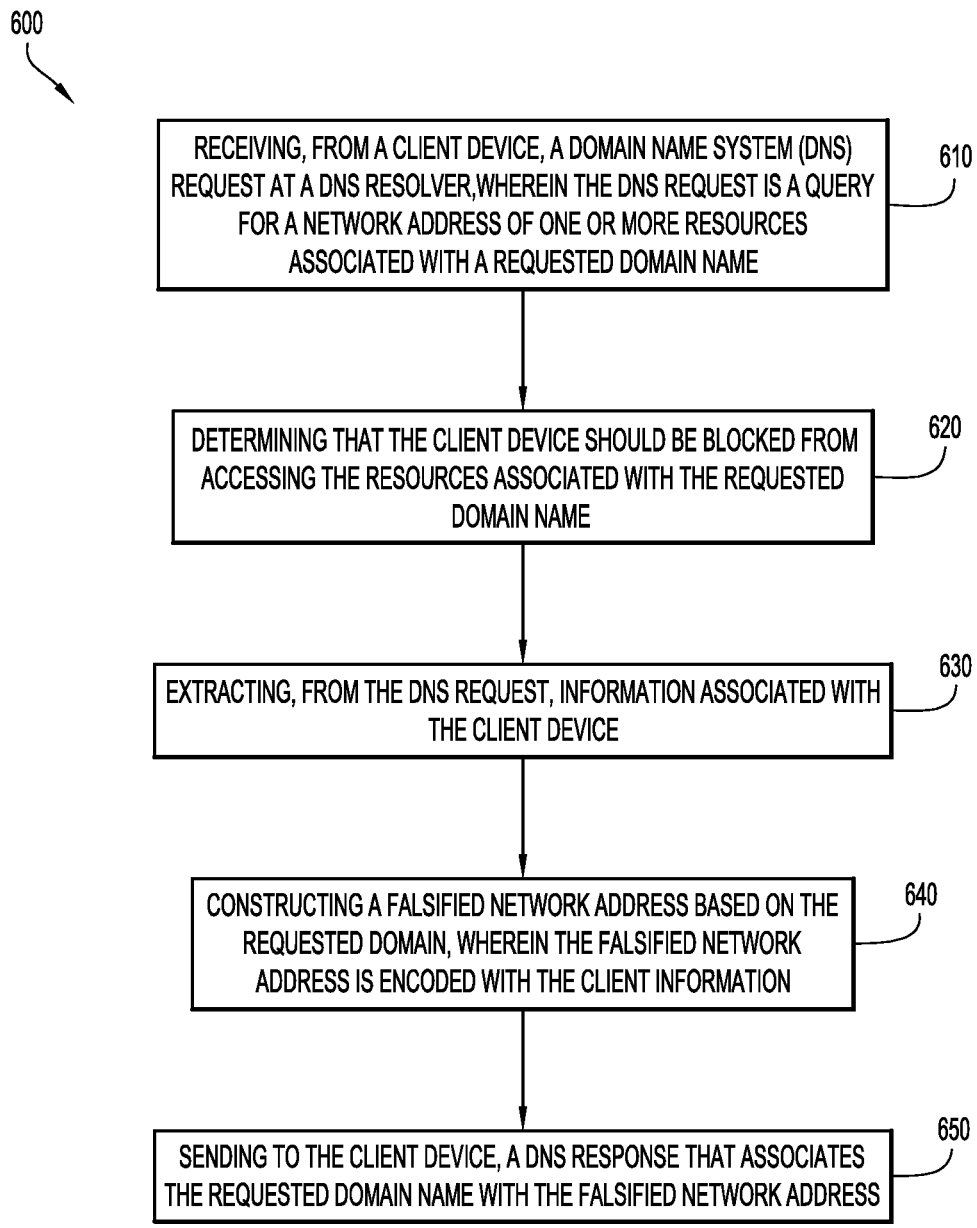
FIG. 6 is a flowchart depicting a process for providing a falsified IP address with encoded client information to a client device, according to an example embodiment.

An example embodiment of a process 600 performed by the DNS resolver 120 for providing a falsified network address encoded with a client identifier is depicted by the flowchart of FIG. 6. Reference is also made to FIGS. 1-3, 4A, 4B, and 5 for purposes of the description of FIG. 6. At 610, the DNS resolver 120 receives from a client device 110 a DNS request at a DNS resolver. The DNS request may be a query for a network address of one or more resources associated with a requested domain name. At 620, the DNS resolver 120 may then determine that the client device should be blocked from accessing the resources associated with the requested domain name. As noted above, the DNS resolver 120 may utilize the security policy module 240 to lookup client device 110 and determine which policies to apply to that client device 110 for the requested domain name. The DNS resolver 120 may lookup the client device 110 in a plurality of block lists to determine whether or not the requested domain name should be blocked for the client device 110. At 630, the DNS resolver 120 may extract the information associated with the client device 110 from the DNS request. As previously noted, the DNS resolver 120 may utilize the client identity determination module 230 to analyze the DNS request and extract the client information, which may include a client identity, from the DNS request. More specifically, the DNS resolver 120 may analyze the source IP of the client device 110 in the DNS request, or, if the DNS request is an EDNS request, the DNS resolver 120 may extract the additional encoded data of the EDNS request to determine the client identity. The DNS resolver 120 may look up the identified client device 110 in the client identification database 260 to determine a unique client identifier for that identified client device 110. At 640, the DNS resolver 120 may then construct a falsified network address when it is determined that the requested domain name should be blocked for the identified client device 110. DNS resolver 120 may utilize the falsification module 250 to encode the falsified network address with the client information. More specifically, the falsified network address may be encoded with the unique client identifier from the client identification database 260. At 650, the DNS resolver 120 may, in response to the DNS request, send to the client device 110 the falsified network address that is encoded with the client identifier.

Figure 7:
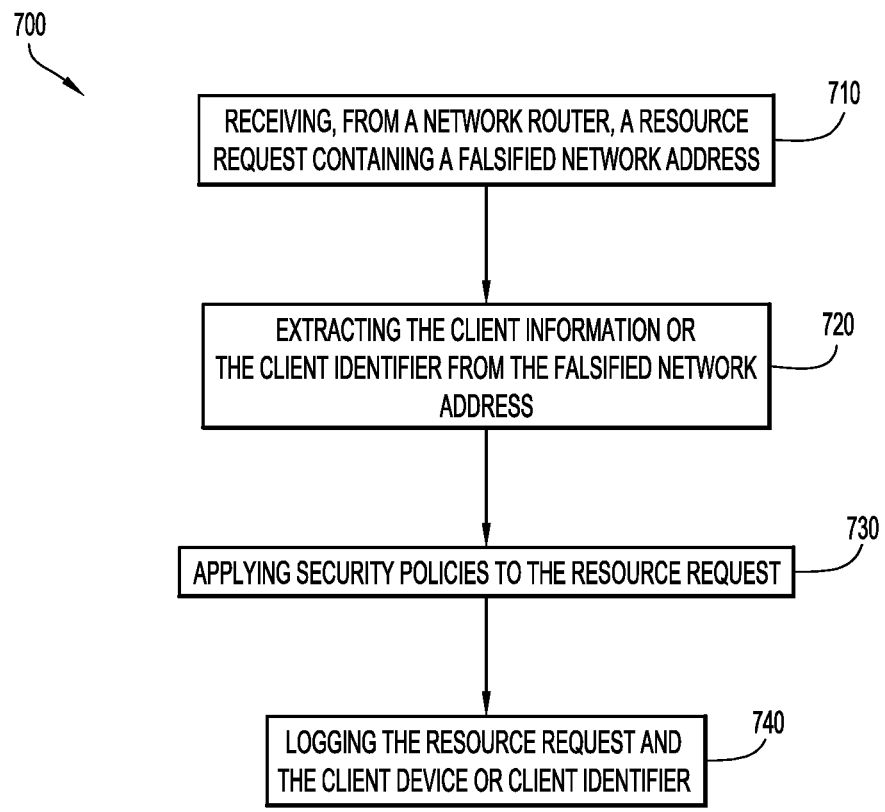
FIG. 7 is a flowchart depicting a process for analyzing a falsified IP address with encoded client information and extracting the client identification from the falsified IP address, according to an example embodiment.

As previously noted, the falsified network address may be an IPv6 address request that includes eight groups of four hexadecimal digits. The first two groups of four hexadecimal digits of the falsified IP address may represent a network portion of the address, while the final two groups of four hexadecimal digits may represent the client information. The falsification module 250 of the DNS resolver 120 enables the DNS resolver 120 to encode at least the final two groups of four hexadecimal digits of the IPv6 address with the client identifier. Once the client device 110 receives the DNS response, which includes the falsified network address, from the DNS resolver 120, the client device 110 attempts to connect with the falsified network address. As previously noted, the falsified IP address may lead the client device 110 to, ultimately, a receiving device or network traffic analyzer 170, that is configured to block the client device 110 from the one or more resources associated with the requested domain name. Effectively, the client device 110 unknowingly passes the client information from the DNS resolver 120 to the network traffic analyzer 170. As previously noted, the network traffic analyzer 170 is further configured to extract the client information from the falsified network address and log the client information An example embodiment of a process 700 performed by the network traffic analyzer 170 for analyzing network traffic, identifying falsified network addresses encoded with a client information or a client identifier, and extracting and logging the client information or client identifier is depicted by the flowchart of FIG. 7. Reference is also made to FIGS. 1-3, 4A, 4B, and 5 for purposes of the description of FIG. 7. At 710, the network traffic analyzer 170 receives, from a network router 160 of a redirection network 150, a resource request that contains a falsified network address. The resource request may have been generated from the client device 110, and the falsified network address of the resource request may contain client information or a client identifier of the client device 110 that generated the resource request. As previously noted, the router 160 may be configured to route all traffic of the redirection network 150 to the network traffic analyzer 170. At 720, the network traffic analyzer 170 may then extract the client information or client identifier from the falsified network address. The network traffic analyzer 170 may utilize the identification extracting module 320 to identify and extract the client information, which may include a client identifier, from the falsified network address. The identification extracting module 320 may also enable the network traffic analyzer 170 to look up the client identifier in the client identification database 360 to determine the identity of the client device 110 sending the request. At 730, the network traffic analyzer 170 applies security policies to the resource request from the identified client device 110. As noted previously, the network traffic analyzer 170 may utilize the security policy module 340 to lookup the identified client device 110 in a plurality of block lists to determine whether or not the resources associated with the requested domain name should be blocked for the identified client device 110. At 740, the network traffic analyzer 170 may log the requested domain name and the client identifier or client device 110 via the network traffic log module 350. The log of the requested domain name and the identified client device 110 may be accessed by network administrators to determine which client devices 110 were attempting to access blocked resources.

The techniques presented herein provide a computer-implemented method of encoding a falsified network address with information that identifies a client device that is attempting to access the resources associated with a domain that is blocked for that client device. The DNS resolver receives, from a client device, a DNS request, where the DNS request is a query for a network address of one or more resources associated with a requested domain name. The DNS resolver may then determine that the client device should be blocked from accessing the resources associated with the requested domain name. The DNS resolver also extracts, from the DNS request, information associated with the client device. Because the domain name should be blocked for the identified client device, the DNS resolver may then construct a falsified network address, where the falsified network address is encoded with the client information. The DNS resolver then sends to the client, in response to the domain name system request, the falsified network address.

In another form, an apparatus is provided comprising a network interface unit configured to network communications, including communication with a plurality of clients, a plurality of web servers, and a redirection network that includes a router and network traffic analyzer; a memory; and a processor configured to: receive, from a client device, a DNS request at a DNS resolver, wherein the DNS request is a query for a network address of one or more resources associated with a requested domain name, determine that the client device should be blocked from accessing the resources associated with the requested domain name, extract, from the DNS request, information associated with the client device, construct a falsified network address based on the requested domain name, wherein the falsified network address is encoded with the client information, and send to the client device, a DNS response that associates the requested domain name with the falsified network address.

In still another form, one or more non-transitory computer readable storage media are provided for a server in communication with a plurality of clients, a plurality of web servers, and a redirection network that includes at least a router and a network traffic analyzer, the computer readable storage media being encoded with software comprising computer executable instructions, and when the software is executed, operable to: receive, from a client device, a DNS request at a DNS resolver, wherein the DNS request is a query for a network address of one or more resources associated with a requested domain name, determine that the client device should be blocked from accessing the resources associated with the requested domain name, extract, from the DNS request, information associated with the client device, construct a falsified network address based on the requested domain name, wherein the falsified network address is encoded with the client information, and send to the client device, a DNS response that associates the requested domain name with the falsified network address.

The above description is intended by way of example only. Various modifications and structural changes may be made therein without departing from the scope of the concepts described herein and within the scope and range of equivalents of the claims.

What is claimed is:

1. A method comprising:
receiving, from a client device, a Domain Name System (DNS) request at a DNS resolver, wherein the DNS request is a query for a network address of one or more resources associated with a requested domain name;
determining that the client device should be blocked from accessing the resources associated with the requested domain name;
extracting, from the DNS request, client information associated with the client device;
constructing a falsified network address based on the requested domain name by encoding the client information extracted from the DNS request into a portion of the falsified network address, wherein the client information includes a unique identifier of the client device that transmitted the DNS request; and
sending to the client device a DNS response that associates the requested domain name with the falsified network address.

2. The method of claim 1, wherein the falsified network address is an Internet Protocol (IP) version 6 address that includes eight groups of four hexadecimal digits, wherein a first two groups of four hexadecimal digits of the falsified network address represent a network portion of the falsified network address, and wherein the client information is encoded in last two groups of the four hexadecimal digits of the falsified network address.

3. The method of claim 1, wherein the unique identifier of the client device is determined from data encoded in an extension to the DNS request.

4. The method of claim 1, wherein the unique identifier of the client device is determined from a source Internet Protocol (IP) address of the client device included in the DNS request.

5. The method of claim 1, wherein the falsified network address redirects the client device to a receiving device that is configured to block the client device from the one or more resources associated with the requested domain name.

6. The method of claim 5, further comprising the receiving device extracting the client information from the falsified network address and logging the client information.

7. The method of claim 1, wherein the determining that the client device should be blocked from accessing the resources associated with the requested domain name is based on the client information associated with the client device and at least one block list or a policy identifying the client device and the resources associated with the requested domain name.

8. An apparatus comprising:
a network interface unit configured to enable network communications; and
a processor configured to:
receive, from a client device, a Domain Name System (DNS) request at a DNS resolver, wherein the DNS request is a query for a network address of one or more resources associated with a requested domain name;
determine that the client device should be blocked from accessing the resources associated with the requested domain name;
extract, from the DNS request, client information associated with the client device;

construct a falsified network address based on the requested domain name by encoding the client information extracted from the DNS request into a portion of the falsified network address, wherein the client information includes a unique identifier of the client device that transmitted the DNS request; and send to the client device, a DNS response that associates the requested domain name with the falsified network address.

9. The apparatus of claim 8, wherein the falsified network address is an Internet Protocol (IP) version 6 address that includes eight groups of four hexadecimal digits, wherein a first two groups of four hexadecimal digits of the falsified network address represents a network portion of the falsified network address, and wherein the client information is encoded in last two groups of the four hexadecimal digits of the falsified network address.

10. The apparatus of claim 8, wherein the unique identifier of the client device is determined from data encoded in an extension to the DNS request.

11. The apparatus of claim 8, wherein the unique identifier of the client device is determined from a source Internet Protocol (IP) address of the client device.

12. The apparatus of claim 8, wherein the falsified network address redirects the client device to a receiving device that is configured to block the client device from the one or more resources associated with the requested domain name.

13. A system comprising the receiving device and the apparatus of claim 12, wherein the receiving device is further configured to extract the client information from the falsified network address and log the client information.

14. The apparatus of claim 8, wherein the processor is configured to determine that the client device should be blocked from the accessing the resources associated with the requested domain name based on the client information associated with the client device that is extracted by the processor and based on at least one block list or a policy identifying the client device and the resources associated with the requested domain name.

15. One or more non-transitory computer readable storage media of a server in communication with clients, the computer readable storage media being encoded with software comprising computer executable instructions, and when the software is executed, operable to:

receive, from a client device, a Domain Name System (DNS) request at a DNS resolver, wherein the DNS request is a query for a network address of one or more resources associated with a requested domain name;

determine that the client device should be blocked from accessing the resources associated with the requested domain name;

extract, from the DNS request, client information associated with the client device;

construct a falsified network address based on the requested domain name by encoding the client information extracted from the DNS request into a portion of the falsified network address, wherein the client information includes a unique identifier of the client device that transmitted the DNS request; and send to the client device, a DNS response that associates the requested domain name with the falsified network address.

16. The computer readable storage media of claim 15, wherein the falsified network address is an Internet Protocol (IP) version 6 address that includes eight groups of four hexadecimal digits, wherein a first two groups of four hexadecimal digits of the falsified network address represents a network portion of the falsified network address, and wherein the client information is encoded in last two groups of the four hexadecimal digits of the falsified network address.

17. The computer readable storage media of claim 15, wherein the unique identifier of the client device is determined from data encoded in an extension to the DNS request or from a source Internet Protocol (IP) address of the client device.

18. The computer readable storage media of claim 15, wherein the falsified network address redirects the client device to a receiving device that is configured to block the client device from the one or more resources associated with the requested domain name.

19. The computer readable storage media of claim 18, further comprising instructions configured to cause the receiving device to extract the client information from the falsified network address and log the client information.

20. The computer readable storage media of claim 15, wherein the executable instructions that are operable to determine include instructions operable to determine that the client device should be blocked from the accessing the resources associated with the requested domain name based on the client information associated with the client device and at least one block list or a policy identifying the client device and the resources associated with the requested domain name.

* * * * *